(12) United States Patent
Yoshida et al.

(10) Patent No.: US 9,276,288 B2
(45) Date of Patent: Mar. 1, 2016

(54) NONAQUEOUS ELECTROLYTE RECHARGEABLE BATTERY

(75) Inventors: Syuuhei Yoshida, Tokoname (JP); Yuuki Tachibana, Chita-gun (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 234 days.

(21) Appl. No.: 13/567,291

(22) Filed: Aug. 6, 2012

(65) Prior Publication Data

US 2013/0034774 A1 Feb. 7, 2013

(30) Foreign Application Priority Data

Aug. 6, 2011 (JP) ................................ 2011-172456

(51) Int. Cl.
*H01M 10/0564* (2010.01)
*H01M 10/0525* (2010.01)
*H01M 10/0567* (2010.01)
*H01M 10/0569* (2010.01)

(52) U.S. Cl.
CPC ...... *H01M 10/0525* (2013.01); *H01M 10/0567* (2013.01); *H01M 10/0569* (2013.01); *H01M 2300/0025* (2013.01); *H01M 2300/0028* (2013.01); *Y02E 60/122* (2013.01)

(58) Field of Classification Search
None
See application file for complete search history.

(56) References Cited

U.S. PATENT DOCUMENTS

| 2003/0148191 A1* | 8/2003 | Mori ............................. 429/330 |
| 2010/0018034 A1* | 1/2010 | Miyasaka et al. ............ 29/623.1 |
| 2010/0081064 A1* | 4/2010 | Watanabe ..................... 429/338 |

FOREIGN PATENT DOCUMENTS

| JP | H05-234618 | 9/1993 |
| JP | H08-171932 | 7/1996 |
| JP | H11-185809 | 7/1999 |
| JP | 2008-052988 | 3/2008 |
| JP | 2009-176534 | 8/2009 |
| JP | 2010-086722 | 4/2010 |
| JP | 2010-102841 | 5/2010 |

OTHER PUBLICATIONS

OA issued Apr. 1, 2014 in corresponding JP Application No. 2011-172456 (with English translation).
V. Gutmann, "Empirical Parameters for Donor and Acceptor Properties of Solvents", Electrochimica Acta, vol. 21, pp. 661-670, 1976, Pergamon Press.
S. Okazaki and I. Sakamoto, "Solvent and Ions—Chemistry of Non-Aqueous Electrolyte Solution", ISBN4-915592-30-8, $1^{st}$ Edition, Jan. 30, 1990, Sanei Publisher.
Choi and Park, "Electrochemistry of Conductive Polymers 46. Polymer Films as Overcharge Inhibitors for Lithium-Ion Rechargeable Batteries," Journal of Electrochemical Science and Technology, vol. 1, No. 1, Sep. 2010.

* cited by examiner

*Primary Examiner* — Ula C Ruddock
*Assistant Examiner* — Matthew Van Oudenaren
(74) *Attorney, Agent, or Firm* — Harness, Dickey & Pierce, P.L.C.

(57) ABSTRACT

A nonaqueous electrolyte rechargeable battery includes a positive electrode, a negative electrode, and a nonaqueous electrolyte. The positive electrode and the negative electrode occlude and discharge lithium irons. The nonaqueous electrolyte contains an additive and a polycyclic aromatic hydrocarbon. The additive includes an organic solvent having a donor number of 18 to 24. A content of the polycyclic aromatic hydrocarbon is 0% to 2.0% of a total mass of the nonaqueous electrolyte.

16 Claims, No Drawings

NONAQUEOUS ELECTROLYTE RECHARGEABLE BATTERY

CROSS REFERENCE TO RELATED APPLICATION

This application is based on Japanese Patent Application No. 2011-172456 filed on Aug. 6, 2011, the disclosure of which is incorporated herein by reference.

TECHNICAL FIELD

The present disclosure relates to a nonaqueous electrolyte rechargeable battery.

BACKGROUND

With rapid market expansion of portable electronic devices, such as a laptop computer and a cell phone, demands of small-sized high capacity rechargeable batteries with a high energy density and excellent charging and discharging cycle characteristics have been increased for use in threes electric devices. In order to meet such demands, nonaqueous electrolyte rechargeable batteries have been developed. A nonaqueous electrolyte rechargeable battery uses alkali metal ions, such as lithium ions, as a charge carrier, and causes an electrochemical reaction in accordance with reception of charged particles of the charge carrier.

With regard to a nonaqueous electrolyte rechargeable battery used for vehicles, such as electric vehicles, higher durability performance has been required to meet with the expected lifetime of the vehicles. In a nonaqueous electrolyte rechargeable battery, if an irreversible reaction, such as incorporation of lithium into a coating when the coating is formed, advances in addition to a regular battery reaction occurring during charging and discharging, the amount of lithium that can contribute to the battery reaction decreases. The decrease in the amount of lithium results in deterioration of a charging and discharging capacity.

For example, JP2010-102841A describes a nonaqueous electrolyte lithium-ion secondary battery with improved durability. JP2010-102841A aims to minimize the decrease in energy density due to irreversible capacity in initial charging and discharging by using a high-capacity positive electrode. As a positive electrode active material that is consumed by the initial irreversible capacity specific to a negative electrode active material including at least one selected from silicon (Si), silicon oxide (Si) and carbon (C), a higher capacity lithium-containing composite nitride represented by a formula $Li_{3-x}M_xN$ (M is one or more transition metals selected from cobalt (Co), nickel (Ni), and copper (Cu), and x is equal to or greater than zero and equal to or less than 0.8) is used. Therefore, the weight of the positive electrode active material that is not used for charging and discharging after the initial discharge is reduced, and hence the energy density of the nonaqueous electrolyte lithium-ion secondary battery increases.

That is, in the secondary battery of JP2010-102841A, the total amount of lithium in the cell is increased by using the high capacity positive electrode. Therefore, even if the lithium is deactivated by the irreversible reaction, the absolute amount of the lithium in the battery is secured, and hence the high capacity is achieved.

In the secondary battery where the source of lithium is merely added in the positive electrode, as JP2010-102841A, the capacity seems to be increased. However, it is difficult to restrict the advance of the irreversible reaction, which is a substantial cause of the capacity deterioration. Although the durability improves for the amount of lithium added, the capacity eventually reduces. Accordingly, the effect is not highly expected in use for a long time.

SUMMARY

It is an object of the present disclosure to provide a nonaqueous electrolyte secondary battery capable of restricting advance of capacity deterioration for a long time.

According to an aspect of the present disclosure, a nonaqueous electrolyte rechargeable battery includes a positive electrode, a negative electrode and a nonaqueous electrolyte. The positive electrode occludes and discharges lithium ions. The negative electrode occludes and discharges lithium ions. The nonaqueous electrolyte contains an additive and a polycyclic aromatic hydrocarbon. The additive includes an organic solvent having a donor number of 18 to 24. A content of the polycyclic aromatic hydrocarbon is % to 2.0% of a total mass of the nonaqueous electrolyte.

DETAILED DESCRIPTION

The inventors found a method of restricting the consumption of lithium due to an irreversible reaction, which is one of causes of the decrease in the charging and discharging capacity. Specifically, the inventors succeeded to restrict the consumption of lithium by adding an organic solvent, as an additive, having a predetermined donor number to a nonaqueous electrolyte. As a mechanism of the irreversible reaction, lithium is incorporated into a coating when the coating is formed. In the case where the additive is added to the nonaqueous electrolyte, because the additive forms a solvation with the lithium, the incorporation of the lithium into the coating is reduced. Although the coating is formed by a reductive composition of the solvent, when the donor number of the organic solvent contained in the additive is equal to or greater than the predetermined number, the affinity of lithium to the additive is greater than a material produced by the reductive decomposition and hence the incorporation of the lithium into the coating is reduced.

Further, the inventors found that, when the nonaqueous electrolyte contains a polycyclic aromatic hydrocarbon, lithium irons solvated with the additive are fixed and stabilized. It is appreciated that the polycyclic aromatic hydrocarbon stabilizes the solvation and promotes separation of the lithium solvated during the charging and the discharging, thereby to improve an output density.

Accordingly, in an embodiment of the present disclosure, a nonaqueous electrolyte rechargeable battery includes a positive electrode, a negative electrode and a nonaqueous electrolyte. The positive electrode occludes and discharges lithium ions. The negative electrode occludes and discharges lithium ions. The nonaqueous electrolyte contains an additive and a polycyclic aromatic hydrocarbon. The additive includes an organic solvent having a donor number of 18 to 24. A content of the polycyclic aromatic hydrocarbon is 0% to 2.0% of a total mass of the nonaqueous electrolyte.

In a case where the donor number is equal to or greater than 18, salvation with lithium ions is easily carried out, and the incorporation of the lithium ions into the coating is effectively restricted. In a case where the donor number is equal to or less than 24, because desolvation of the lithium ions is easily carried out when the charging and discharging reactions are expected to be advanced, transfer resistance of the lithium ions can be reduced. Therefore, the output of the nonaqueous electrolyte rechargeable battery improves.

The "donor number" of the present disclosure is also referred to as Gutmann's donor number, and is defined as follows utilizing that an antimony (Sb) atom in antimony pentachloride is a strong Lewis acid which easily forms a six coordinate structure by receiving an electron pair from a Lewis base. As a reference base, 1,2-dichloroethane is selected, and the heat of reaction (ΔH) generated in a reaction of the antimony pentachloride and the organic solvent, which serves as an electron donor, as a measuring target is measured. The reaction is an exothermal reaction, and the donor number is defined by the number obtained by changing the sign of the value of the heat of reaction (ΔH) expressed in a measurement unit of kcal·moL$^{-1}$.

The polycyclic aromatic hydrocarbon is an aromatic compound having two or more rings, and made of carbon and hydrogen. Although not included in the polycyclic aromatic hydrocarbon, a compound having electrons (e.g., π electrons) which can interact with solvated lithium, such as a heterocyclic compound that has one ring and contains an element such as nitrogen, oxygen and sulfur, may be used. Also in this case, a similar effect as the polycyclic aromatic hydrocarbon may be achieved.

In an embodiment of the present disclosure, the content of the polycyclic aromatic hydrocarbon is greater than 0% of the total mass of the nonaqueous electrolyte. The polycyclic aromatic hydrocarbon can stabilize the solvation formed by the additive and the lithium and can enhance the separation during the charging and the discharging. Therefore, when the nonaqueous electrolyte essentially contains the polycyclic aromatic hydrocarbon, the decrease in the charging and discharging capacity is restricted as well as the output density is improved.

In an embodiment of the present disclosure, a content of the additive is 1.2% to 15.4% of the total mass of the nonaqueous electrolyte.

In an embodiment of the present disclosure, the polycyclic aromatic hydrocarbon has an electron affinity lower than that of a graphite.

In an embodiment of the present disclosure, the polycyclic aromatic hydrocarbon has a negative electron affinity. The polycyclic aromatic hydrocarbon can stabilize lithium ions solvated. Further, in the case where the polycyclic aromatic hydrocarbon has such an electron affinity, the stability of the lithium ions solvated can be maintained and the lithium ions solvated can be separated during the charging and discharging.

In an embodiment of the present disclosure, the nonaqueous electrolyte contains at least one of an oxalate complex and an oxalate derivative complex.

In a nonaqueous electrolyte rechargeable battery, LiPF$_6$ or LiBF$_4$ is generally used as a supporting salt. Further, it is proposed to use another supporting salt that has an oxalate complex as an anion component, such as lithium bis(oxalate) borate (LiBOB). In the lithium salt having the oxalate complex, such as LiBOB, however, electric charges are configured in a non-localized manner, and hence there is a possibility that durability of the rechargeable battery is insufficient. When the organic solvent having the above described donor number is used with the supporting salt containing such as oxalate complex as the additive, electric charges are compensated from the organic solvent as the additive to the oxalate complex, and thus the oxalate complex is stabilized. Therefore, the durability and the output performance of the rechargeable battery improve. Further, the polycyclic aromatic hydrocarbon may be additionally added together with the organic solvent. In this case, the effect of stabilization further improves.

In an embodiment of the present disclosure, the positive electrode contains an olivine-type iron phosphate. The nonaqueous electrolyte in which the positive electrode contains the olivine-type iron phosphate is used in a relatively low potential range. Decomposition of the organic solvent used as the additive is likely to be advanced when a high potential is applied. However, when the organic solvent as the additive is used with the olivine-type iron phosphate, deterioration of the additive is restricted. Because irreversible consumption of the lithium ions due to the salvation is restricted for a long time, the durability of the nonaqueous electrolyte rechargeable battery improves.

An embodiment of the present disclosure will be described hereinafter in detail. In the embodiment, a nonaqueous electrolyte rechargeable battery has a positive electrode, a negative electrode, a nonaqueous electrolyte. The nonaqueous electrolyte rechargeable battery may have any other member.

The positive electrode contains a positive-electrode active material at least. The positive-electrode active material allows discharge of lithium ions during charging and allows occlusion of the lithium ions during discharging. Material composition of the positive electrode is not particularly limited, and the positive electrode may have known material composition. For example, the positive electrode is provided by a structure in which an active material layer is formed on a collector. The active material layer is formed by depositing a mixture of a positive-electrode active material, a conductive material and a binder on the collector.

The positive-electrode active material is not limited to a specific one, but includes a lithium-containing transition metal oxide, for example. The lithium-containing transition metal oxide is a material into and from which Li$^+$ ions can be inserted and desorbed. The lithium-containing transition metal oxide may include a lithium-metal composite oxide having a layered structure or a spinel structure, as an example. Examples of the lithium-metal composite oxide are Li$_{1-z}$FePO$_4$, Li$_{1-z}$NiO$_2$, Li$_{1-z}$MnO$_2$O$_4$, Li$_{1-z}$CoO$_2$, Li$_{1-z}$Co$_x$Mn$_y$Ni$_{(1-x-y)}$O$_2$, and the like and the positive-electrode active material may contain one or more elements selected from these examples. In the examples, z is the number equal to or greater than 0 and less than 1, and x and y are numbers equal to or greater than 0 and equal to or less than 1. In these examples, Li, Mg, Al, or a transition metal, such as Co, Ti, Nb, or Cr, may be added to or substituted for each element. Such a lithium-metal composite oxide may be independently used. Alternatively, a plurality of kinds of these oxides may be mixed and used together. Further, a conductive polymer material or material having radicals may also be mixed.

For example, the positive-electrode active material is a lithium and transitional metal composite oxide, such as LiFePO$_4$, LiMn$_2$O$_4$, LiCoO$_2$, or LiNiO$_2$. In these cases, the positive-electrode active material has favorable properties as an active material, such as having a favorable diffusion property of electrons and lithium ions, and hence a rechargeable battery having high charging and discharging efficiency and favorable cycle characteristics can be achieved. In an embodiment, the positive-electrode active material is LiFePO$_4$.

The binder of the positive electrode serves to bind active material particles. As the binder of the positive electrode, for example, an organic binder and an inorganic binder are used. For example, the binder of the positive electrode includes a compound, such as polyvinylidene fluoride (PVDF), polyvinylidene chloride, polytetrafluoroethylene (PTFE), carboxymethyl cellulose, or the like.

The conductive material serves to maintain a positive electric conductivity. For example, the conductive material is one of or mixture of carbon substances, such as carbon black, acetylene black (AB), and graphite.

The collector of the positive electrode is, for example, provided by a processed metal of such as aluminum or stainless steel. For example, the collector of the positive electrode has a foil shape, plate shape, net shape or the like. Further, the collector of the positive electrode is provided by a punched metal, a form metal or the like.

The negative electrode is made of a material that allows occlusion of lithium ions during the charging and allows discharge of the lithium ions during the discharging. For example, the material of the negative electrode is a metallic lithium, an alloy base material, a carbon base material or the like. The material composition of the negative electrode is not limited to specific one, but may be any known composite material. For example, the negative electrode is provided by a structure in which an active material layer is formed on a collector. The active material layer is formed by depositing a mixture of a negative-electrode active material and a binder on the collector.

As an example, the alloy base material is used for the negative-electrode active material in view of an increase in battery capacity. The alloy base material is a material that is capable of occluding or desorbing a lithium element, or dissolving or separating a lithium element in accordance with the advance of the battery reaction. The alloy base material is a material that allows alloying, compounding, dealloying and decompounding of the lithium element.

In the present disclosure, the alloying and the compounding are both referred to as the alloying, and the dealloying and decompounding are both referred to as the decompounding. Further, "alloy" means a material made of two or more metal elements, and a compound made of one or more metal elements and one or more metalloid elements. The formation of the alloy base material includes a solid solution, an eutectic (eutectic mixture), an intermetallic compound, and a material in which two or more of the solid solution, the eutectic and the intermetallic compound coexist.

Examples of the metal elements and the metalloid elements are magnesium (Mg), gallium (Ga), aluminum (Al), silicon (Si), germanium (Ge), tin (Sn), lead (Pb), arsenic (As), antimony (Sb), bismuth (Bi), silver (Ag), gold (Au), zinc (Zn), cadmium (Cd), mercury (Hg), copper (Cu), vanadium (V), indium (In), boron (B), zirconium (Zr), yttrium (Y) and hafnium (Hf). In the embodiment, the alloy base material may contain at least one of these elements as a simple substance or the alloy.

For example, the alloy base material contains the metal element of IVB group or the metalloid element in a short period-type periodic table as the simple substance or the alloy. As an example, the alloy base material contains silicon (Si) or tin (Sn), or the alloy of silicon and tin. These elements may be crystalline or amorphous.

As further examples, the material of the negative electrode, which occludes and discharges lithium, may include an oxide, a sulfide, and other metallic compounds such as lithium nitrides (e.g., $LiN_3$). For example, the oxide includes $MnO_2$, $V_2O_6$, $V_6O_{13}$, NiS, MoS and the like. Further, the oxide includes iron oxide, ruthenium oxide, molybdenum oxide, tungstic oxide, titanium oxide, tin oxide and the like, as examples of the oxide that occludes and discharges lithium, but has a relatively low electric potential. For example, the sulfide includes NiS, MoS and the like.

The binder of the negative electrode serves to bind the active material particles. As the binder of the negative electrode, for example, an organic binder and an inorganic binder are used. For example, the binder of the negative electrode includes a compound, such as polyvinylidene fluoride (PVDF), polyvinylidene chloride, polytetrafluoroethylene (PTFE), carboxymethyl cellulose, or the like.

The collector of the negative electrode is, for example, provided by a processed metal of such as copper and nickel. For example, the collector of the negative electrode has a foil shape, plate shape, net shape or the like. As other examples, the collector of the negative electrode is provided by a punched metal, a form metal or the like.

The nonaqueous electrolyte may have any formation, such as a liquid state and a gel state. The nonaqueous electrolyte contains an additive. The additive includes an organic solvent having a donor umber (DN) of 18 to 24, and may be a mixture of two or more organic solvents. The donor number of the organic solvent is measured by the method described above.

Examples of the organic solvent having the donor number of 18 to 24 are 2-methyltetrahydrofuran (DN: 18.0), diethyl ether (DN: 19.2), tetrahydrofuran (DN: 20.0), 1,2-dimethoxyethane (DN: 24.0), oxolane-2-on (CAS Nr: 96-48-0, DN: 18.0), tributyl phosphate (CAS Nr: 126-73-8, DN: 23.7), and trimethyl phosphate (CAS Nr: 512-56-1, DN: 23.0), as described in the following non-patent document:

V. Gutmann, "EMPIRICAL PARAMETERS FOR DONOR AND ACCEPTOR PROPERTIES OF SOLVENTS", Electochimica Acta, Vol. 21, pp. 661-670, 1976

In a range from 18 to 24, a higher donor number indicates higher durability. The content of the additive in the nonaqueous electrolyte is not particularly limited. However, it is appreciated that the effect improves when the content of the additive is 1.2% to 15.4% of the total mass of the nonaqueous electrolyte, as shown in the experimental results of examples described later. Further, it is to be noted that the additive exerts the effect of restricting the lithium irons from being incorporated into the coating, irrespective to the content thereof. Therefore, even if the content of the additive is not in the range of 1.2% to 15.4%, the effect of improving the durability can be achieved.

For example, the liquid state nonaqueous electrolyte includes a solution containing a supporting salt and an organic solvent for dissolving the supporting salt, an ionic solution and the like. For example, the organic solvent includes ethylene carbonate (EC), propylene carbonate (PC), dimethyl carbonate (DMC), ethylmethyl carbonate (EMC), and diethyl carbonate (DEC). These examples of the organic solvent have a high oxidative degradation potential, such as 4.3 V or more, and thus contribute to improve the stability of the nonaqueous electrolyte rechargeable battery when being used as the solvent of the nonaqueous electrolyte.

In addition to the examples described above, an organic solvent that is generally used for an electrolyte solution of a nonaqueous electrolyte rechargeable battery may be used. For example, carbonates other than the above described carbonates, a halogenated hydrocarbon, ethers, ketones, a nitrides, lactones, oxolane compounds, and the like may be used. For example, a propylene carbonate, an ethylene carbonate, 1,2-dimethoxyethane, dimethyl carbonate, diethyl carbonate, ethylmethyl carbonate, vinyl carbonate, and a mixture of these solvents may be used. When the supporting salt is dissolved in these solvents, these solvents can serve as the electrolyte.

The supporting salt is not limited to a specific one, but may include salt compounds, such as $LiPF_6$, $LiBF_4$, $LiAsF_6$, $LiCF_3SO_3$, $LiN(CF_3SO_2)_2$, $LiC(CF_3SO_2)_3$, $LiSbF_6$, LiSCN, $LiClO_4$, $LiAlCl_4$, $NaClO_4$, $NaBF_4$, NaI, and a derivative thereof. Of these examples, one or more kinds of salts selected from the group consisting of $LiPF_6$, $LiBF_4$, $LiClO_4$, LiAsF$_6$, LiCF$_3$SO$_3$, LiN(CF$_3$SO$_2$)$_2$, LiC(CF$_3$SO$_2$)$_3$, LiN(FSO$_2$)$_2$, LiN(CF$_3$SO$_2$)(C$_4$F$_9$SO$_2$), a derivative of LiCF$_3$SO$_3$, a derivative of LiN(CF$_3$SO$_2$)$_2$, and a derivative of LiC(CF$_3$SO$_2$)$_3$ are exemplarily used in view of electric characteristics.

As the supporting salt, an oxalate complex and/or an oxalate derivative complex may be added to the solution. Examples of the oxalate complex and the oxalate derivative complex are lithium bis(oxalate) borate (LiBOB), lithium difluoro(oxalate) borate (LiFOB), lithium difluorobis(oxalate) phosphate, lithium bis(oxalate) silane, and complexes expressed in the following Chemical formula 1.

[Chemical formula 1]

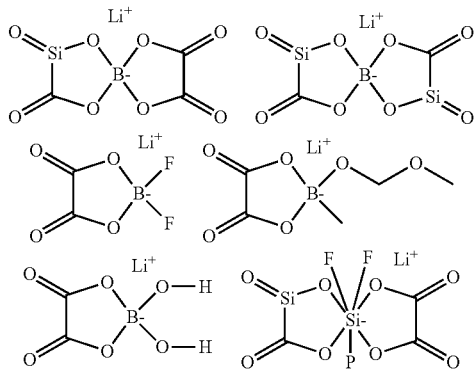

The nonaqueous electrolyte contains a polycyclic aromatic hydrocarbon of 2.0% or less with respect to the total mass of the nonaqueous electrolyte. The lower limit of the content of the polycyclic aromatic hydrocarbon is not limited to a specific one. For example, the content of the polycyclic aromatic hydrocarbon is 0% to 2.0% of the total mass of the nonaqueous electrolyte. As another example, the content of the polycyclic aromatic hydrocarbon is 0.1% to 2.0% of the total mass of the nonaqueous electrolyte. In the case where the nonaqueous electrolyte contains the polycyclic aromatic hydrocarbon as an essential element, such as of equal to or greater than 0.1%, disolvation of the lithium ions, which are solvated by the additive, can be promptly advanced by the battery reaction when required.

The polycyclic aromatic hydrocarbon is an aromatic compound that has two or more rings and made of carbon and hydrogen. The polycyclic aromatic hydrocarbon is not limited to a specific one. For example, the polycyclic aromatic hydrocarbon is the one in which a value of an electron affinity is smaller than that of a graphite. Further, the polycyclic aromatic hydrocarbon is the one having a negative electron affinity. The value of the electron affinity is calculated by a molecular orbital calculation. For example, the value of the electron affinity is provided by National Institute of Standards and Technology (NIST), and such value can be used.

The nonaqueous electrolyte may be in a gel state by adding a gelatinizing agent.

In addition to or in place of the supporting salt and organic solvent described above, an ionic solution, which can be used for the nonaqueous electrolyte rechargeable battery, may be used. A cation component of the ionic solution may include an N-methyl-N-propylpiperidinium, a dimethyl-ethyl methoxy ammonium cation, and the like. An anion component of the ionic solution may include BF$^{4-}$, N(SO$_2$CF$_3$)$^{2-}$, and the like.

In addition to the positive electrode, the negative electrode and the nonaqueous electrolyte, the nonaqueous electrolyte rechargeable battery may include any other member, if necessary, such as a separator and a case. The separator is disposed between the positive electrode and the negative electrode. The separator provides electric insulation and ionic conduction. In, a case where the nonaqueous electrolyte is in the liquid state, the separator serves to hold the nonaqueous electrolyte.

The separator may be provided by a porous synthetic resin film. For example, the porous synthetic resin film includes a porous film of a polyolefin base macromolecule, such as polyethylene and polypropylene. For example, the size of the separator may be greater than an area of the positive electrode and the negative electrode in order to maintain insulation between the positive electrode and the negative electrode.

EXAMPLES

The nonaqueous electrolyte rechargeable battery of the embodiment will be hereinafter described in detail based on the following examples.

<Manufacturing of Test Batteries>

As test examples, test batteries 1-1 through 1-19 and 2-1 through 2-10 are prepared. Each of the test batteries 1-1 through 1-19 and 2-1 through 2-10 is prepared by combining components shown in Tables 1 through 4. A manufacturing method of the test battery 1-1 will be described hereinafter as an example. The other test batteries 1-2 through 1-19 and 2-1 through 2-10 are prepared in the similar manner.

The test battery 1-1 is a lithium rechargeable battery using a lithium composite oxide represented by the composition LiFePO$_4$ as the positive-electrode active material and a graphite as the negative-electrode active material.

A positive electrode is manufactured in the following manner. First, 80 parts by mass of the positive-electrode active material described above, 10 parts by mass of acetylene black (AB) as a conductive material, and 10 parts by mass of polyvinylidene difluoride (PVDF) as a binder are mixed together, and an appropriate amount of an N-methyl-2-pyrrolidone is added to this mixture to form a paste-like positive electrode mixture. The positive electrode mixture is applied to both sides of a positive-electrode collector made of an aluminum foil with a thickness of 15 μm (micrometers), dried and processed by pressing, so a sheet-like positive electrode is produced. The sheet-like positive electrode is cut into a band shape to produce a positive electrode plate. Further, the positive electrode mixture is scratched from a part of the positive electrode plate, and a positive electrode battery lead is joined to the positive electrode plate.

A negative electrode is manufactured in the following manner. First, 98 parts by mass of a graphite, and 1 part by mass of each of carboxymethyl cellulose (CMG) and stylene butadiene rubber (SBR) as the binder are mixed together to form a paste-like negative electrode mixture. The negative electrode mixture is applied to both sides of a negative-electrode collector made of a copper foil with a thickness of 10 μm, dried and processed by pressing, so a sheet-like negative electrode is produced. The sheet-like negative electrode is cut into a band shape to produce a negative electrode plate. The negative electrode mixture is scratched from a part of the negative electrode plate, and a negative electrode battery lead is joined to the negative electrode plate. In the example, an aquatic binder is exemplarily used as the binder. Instead, a solvent binder including an N-methyl-2-pyrrolidone may be used.

A separator is interposed between the positive electrode plate and the negative electrode plate to form a stacked body. The stacked body of the positive electrode plate and the negative electrode plate between which the separator is interposed is wound to form a flat wound-type electrode body. The outer perimeter of the electrode body is wrapped with the separator to keep insulation from a periphery.

A nonaqueous electrolyte is produced in the following manner. First, EC, DMC and EMC are mixed at a ratio of 30:30:40 to form a mixed solvent. Then, 10 mass % of $LiPF_6$ and 2 mass % of VC are dissolved in the mixed solvent. Further, 9.6 mass % of 2-methyltetrahydrofuran as an additive and 0.4 mass % of naphthalene as a polycyclic aromatic hydrocarbon are dissolved in the mixed solvent. As a battery case, a laminating case is used.

The other test batteries 1-2 through 1-19 and 2-1 through 2-10 are manufactured in the similar manner, except that the compositions are different.

<Cycle Test (Evaluation of Durability Characteristic)>

After conditioning of each of the test batteries, charging and discharging are performed for 300 cycles at an ambient temperature of 60 degrees Celsius (° C.), one cycle including constant current and constant voltage (CC-CV) charging (1C, 4.0V) and constant current (CC) discharging (to 2.0V). A capacity maintenance ratio to the first charging capacity (initial capacity) is calculated. The capacity maintenance ratio of the test battery 2-1 is defined as 100, and the capacity maintenance ratio of each test battery is calculated as a value relative to the capacity maintenance ratio of the test battery 2-1. The higher capacity maintenance ratio indicates a higher durability characteristic.

<Output Characteristic Test>

When the state of charge (SOC) is 60%, the discharging is performed at each of discharge rates 1C, 2C, 3C, 5C and 10C. Further, a gradient of voltage after ten seconds elapsed from the time before the discharging is begun is calculated in each case, and an internal resistance is measured based on the gradient of voltage calculated. As a measurement condition, the ambient temperature is −15° C. The internal resistance of the test battery 2-1 is defined as 100, and the internal resistance of each test battery is calculated as a value relative to the internal resistance of the test battery 2-1. The smaller internal resistance indicates a higher output characteristic.

TABLE 1

|  | Additive | Donor number | Durability characteristic | Output characteristic |
|---|---|---|---|---|
| Test battery 1-1 | 2-methyltetrahydrofuran | 18.0 | 105 | 83 |
| Test battery 1-2 | Diethyl ether | 19.2 | 109 | 82 |
| Test battery 1-3 | Tetrahydrofuran | 20.0 | 115 | 81 |
| Test battery 1-4 | 1,2-dimethoxyethane | 24.0 | 119 | 87 |
| Test battery 2-1 | — | — | 100 | 100 |
| Test battery 2-2 | Acetonitrile | 14.1 | 92 | 93 |
| Test battery 2-3 | Dimethylformamide | 26.6 | 111 | 108 |
| Test battery 2-4 | Dimethyl sulfoxide | 29.8 | 109 | 108 |

Although the test batteries shown in the table 1 contain different additives, except for the test battery 2-1, the content of the additive of each test battery is the same as that of the test battery 1-1. The other components of the test batteries shown in the table 1 are the same as those of the test battery 1-1.

<Examination about Presence and Kind of Additive>

As shown in the table 1, it is appreciated that the durability characteristic and output characteristic of the test batteries 1-1 through 1-4 each containing the additive with the donor number of 18.0 to 24.0 are higher than those of the test battery 2-1 (comparative example) without containing the additive. With regard to the test battery 2-2, the donor number is less than 18.0. Therefore, the durability characteristic of the test battery 2-2 is not sufficient though the output characteristic is high. With regard to the test battery 2-3, the donor number is greater than 24.0. Therefore, the output characteristic of the test battery 2-3 is not sufficient though the durability characteristic is high. Accordingly, it is appreciated that the durability characteristic and the output characteristic of the battery are high when the donor number is in a range of 18.0 to 24.0.

TABLE 2

|  | Polycyclic aromatic hydrocarbon | Electron affinity | Durability characteristic | Output characteristic |
|---|---|---|---|---|
| Test battery 1-3 | Naphthalene | −0.26 | 115 | 81 |
| Test battery 1-5 | Fluorene | −0.31 | 108 | 77 |
| Test battery 1-6 | Azulene | 0.63 | 106 | 94 |
| Test battery 1-7 | Acenaphthylene | 0.71 | 107 | 97 |
| Test battery 1-8 | Biphenylene | 0.15 | 108 | 92 |
| Test battery 1-9 | Pyrene | 0.41 | 104 | 95 |
| Test battery 1-10 | Tetracene | 1.08 | 102 | 99 |
| Test battery 1-11 | Benzanthracene | 0.77 | 106 | 92 |
| Test battery 2-1 | — | — | 100 | 100 |
| Test battery 2-5 | Hexacene | 1.78 | 104 | 117 |

The test batteries shown in the table 2, except for the test battery 2-1, contain different kinds of the polycyclic aromatic hydrocarbon, but the content of the additive is the same as that of the test battery 1-1. The other components of the test batteries shown in the table 2 are the same as those of the test battery 1-1.

<Examination about Presence and Kind of Polycyclic Aromatic Hydrocarbon>

As shown in the table 2, it is appreciated that the test batteries 1-3, 1-5 through 1-11, in which the value of the electron affinity of the polycyclic aromatic hydrocarbon is smaller than that of the graphite (1.65 eV), have the output characteristic higher than that of the test battery 2-1 (comparative example) without containing the cyclic aromatic hydrocarbon. Also, it is appreciated that the test batteries 1-3, 1-5 through 1-11 have the output characteristic higher than that of the test battery 2-5 in which the value of the electron affinity is greater than that of the graphite.

Particular, the test batteries 1-3 and 1-5 have the negative electron affinity. It is appreciated that the output characteristic of the test batteries 1-3 and 105 is higher than the output characteristic of other test batteries 1-6 through 1-11 and 2-5 that have the electron affinity higher than the test batteries 1-3 and 1-5 and the test battery 2-1 without having the polycyclic aromatic hydrocarbon.

TABLE 3

|  | Dosage of additive (mass %) | Dosage of polycyclic aromatic hydrocarbon (mass %) | Durability characteristic | Output characteristic |
|---|---|---|---|---|
| Test battery 1-3 | 9.6 | 0.4 | 115 | 81 |
| Test battery 1-12 | 1.2 | 0.1 | 109 | 88 |
| Test battery 1-13 | 9.6 | 1.2 | 111 | 77 |
| Test battery 1-14 | 15.4 | 2.0 | 104 | 91 |
| Test battery 1-15 | 1.2 | 0.0 | 102 | 111 |
| Test battery 2-1 | — | — | 100 | 100 |
| Test battery 2-6 | 9.6 | 3.9 | 88 | 116 |

With regard to the test batteries shown in the table 3, except for the test battery 2-1, the kind of the additive is changed to tetrahydrofuran and the tetrahydrofuran as the additive is added with the amount shown. Also, the polycyclic aromatic hydrocarbon is added with the amount shown. The other components are the same as those of the test battery 1-1.

<Examination about Dosage of Additive and Dosage of Polycyclic Aromatic Hydrocarbon>

As shown in the table 3, the test batteries 1-3 and 1-12 through 1-15, in which the dosage of the polycyclic aromatic hydrocarbon is equal to or greater than 2.0 mass %, have the durability characteristic higher than that of the test batteries 2-1 and 2-6. Namely, it is appreciated that the durability improves irrespective of the dosage of the additive when the dosage of the polycyclic aromatic hydrocarbon is equal to or less than 2.0 mass %. Further, as comparing the test batteries 1-3, 1-12 through 1-14 to the test battery 1-15, it is appreciated that the output characteristic improves by adding the polycyclic aromatic hydrocarbon. Moreover, as comparing the test batteries 1-3, 1-12 through 1-15 and 2-1 to the test battery 2-6, it is appreciated that the output characteristic is maintained high when the dosage of the polycyclic aromatic hydrocarbon is equal to or less than 2.0 mass %.

TABLE 4

|  | Nonaqueous electrolyte (oxalate complex) | Additive and Polycyclic aromatic hydrocarbon | Durability characteristic | Output characteristic |
|---|---|---|---|---|
| Test battery 1-3 | $LiPF_6$ only | Added | 115 | 81 |
| Test battery 1-16 | Lithium bis(oxalate) borate | Added | 130 | 75 |
| Test battery 1-17 | Lithium difluoro(oxalate) borate | Added | 124 | 77 |
| Test battery 1-18 | Lithium difluorobis(oxalate) phosphate | Added | 135 | 74 |
| Test battery 1-19 | lithium bis(oxalate) silane | Added | 128 | 75 |
| Test battery 2-1 | $LiPF_6$ only | Not added | 100 | 100 |
| Test battery 2-7 | lithium bis(oxalate) borate | Not added | 95 | 102 |
| Test battery 2-8 | lithium difluoro(oxalate) borate | Not added | 96 | 104 |
| Test battery 2-9 | lithium difluorobis(oxalate) phosphate | Not added | 97 | 101 |
| Test battery 2-10 | lithium bis(oxalate) silane | Not added | 98 | 100 |

With regard to each of the test batteries 1-16 through 1-19, 2 mass % of the oxalate complex or the oxalate derivative complex shown in the table 4 is added to the nonaqueous electrolyte. Other components of the test batteries 1-16 through 1-19 are the same as those of the test battery 1-3. With regard to each of the test batteries 2-7 through 2-10, 2 mass % of the oxalate complex or the oxalate derivative complex shown in the table 4 is added to the nonaqueous electrolyte. Other components of the test batteries 2-7 through 2-10 are the same as those of the test battery 2-1.

As shown in the table. 4, as comparing the results of the test batteries 1-16 through 1-19 to the result of the test battery 1-3, the durability characteristic and the output characteristic of the test batteries 1-16 through 1-19 in which the oxalate complex or the oxalate derivative complex is added, are more favorable than those of the test battery 1-3. Therefore, it is appreciated that it is effective to add the oxalate complex or the oxalate derivative complex to the nonaqueous electrolyte.

<Evaluation of the Effect of Addition of Oxalate Complex or Oxalate Derivative Complex to Nonaqueous Electrolyte>

As shown in the table 4, the durability characteristic and the output characteristic of the test batteries 1-16 through 1-19 in which the oxalate complex or the oxalate derivative complex is added are higher than the durability characteristic and the output characteristic of the test battery 1-3. Therefore, it is appreciated that it is effective to add the oxalate complex or the oxalate derivative complex to the nonaqueous electrolyte.

With regard to the test batteries 2-1 and 2-7 through 2-10 in which the additive and the polycyclic aromatic hydrocarbon are not added, the durability characteristic and the output characteristic of the test batteries 2-7 through 2-10 containing the oxalate complex or the oxalate derivative complex are similar to or slightly lower than those of the test battery 2-1 without containing the oxalate complex and the oxalate derivative complex. Therefore, it is appreciated that it is effective to add the oxalate complex or the oxalate derivative complex in addition to the additive and the polycyclic aromatic hydrocarbon.

While only the selected embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the embodiments according to the present disclosure is provided for illustration only, and not for the purpose of limiting the disclosure as defined by the appended claims and their equivalents.

What is claimed is:

1. A nonaqueous electrolyte rechargeable battery comprising:
   a positive electrode occluding and discharging lithium ions, the positive electrode containing an olivine-type iron phosphate;
   a negative electrode occluding and discharging lithium ions; and
   a nonaqueous electrolyte containing an additive to generate solvation of the lithium ions and a polycyclic aromatic hydrocarbon to fix and stabilize solvated lithium ions, the additive including an organic solvent having a donor number of 18 to 24, a content of the polycyclic aromatic hydrocarbon being greater than 0% and equal to or less than 2.0% of a total mass of the nonaqueous electrolyte; wherein
   the nonaqueous electrolyte contains at least one of an oxalate complex and an oxalate derivative complex.

2. The nonaqueous electrolyte rechargeable battery according to claim 1, wherein a content of the additive is 1.2% to 15.4% of the total mass of the nonaqueous electrolyte.

3. The nonaqueous electrolyte rechargeable battery according to claim 1, wherein the polycyclic aromatic hydrocarbon has an electron affinity lower than that of a graphite.

4. The nonaqueous electrolyte rechargeable battery according to claim 1, wherein the polycyclic aromatic hydrocarbon has a negative electron affinity.

5. The nonaqueous electrolyte rechargeable battery according to claim 1, wherein
   a content of the additive is 1.2% to 15.4% of the total mass of the nonaqueous electrolyte, the polycyclic aromatic hydrocarbon has an electron affinity lower than that of a graphite, and the nonaqueous electrolyte contains at least one of an oxalate complex and an oxalate derivative complex.

6. A nonaqueous electrolyte rechargeable battery comprising:
- a positive electrode occluding and discharging lithium ions, the positive electrode containing an olivine-type iron phosphate;
- a negative electrode occluding and discharging lithium ions; and
- a nonaqueous electrolyte consisting essentially of an additive to generate solvation of the lithium ions, a polycyclic aromatic hydrocarbon to fix and stabilize solvated lithium ions, at least one of an oxalate complex and an oxalate derivative complex, and LiPF$_6$, wherein the additive includes an organic solvent having a donor number of 18 to 24, a content of the additive is equal to or greater than 1.2% and equal to or less than 15.4% of a total mass of the nonaqueous electrolyte, a content of the polycyclic aromatic hydrocarbon is equal to or greater than 0.1% and equal to or less than 2.0% of the total mass of the nonaqueous electrolyte, the organic solvent is at least one selected from the group consisting of 2-methyltetrahydrofuran, diethyl ether, tetrahydrofuran, and 1,2-dimethoxyethane, the polycyclic aromatic hydrocarbon is at least one selected from the group consisting of naphthalene, fluorene, azulene, acenaphthylene, biphenylene, pyrene, tetracene, and benzanthracene, and the at least one of the oxalate complex and the oxalate derivative complex is at least one selected from the group consisting of lithium bis(oxalate) borate, lithium difluoro(oxalate) borate, lithium difluorobis(oxalate) phosphate, and lithium bis(oxalate)borate.

7. The nonaqueous electrolyte rechargeable battery according to claim 6, wherein the nonaqueous electrolyte contains an oxalate complex.

8. The nonaqueous electrolyte rechargeable battery according to claim 6, wherein the nonaqueous electrolyte contains an oxalate derivative complex.

9. The nonaqueous electrolyte rechargeable battery according to claim 1, wherein the nonaqueous electrolyte contains an oxalate complex.

10. The nonaqueous electrolyte rechargeable battery according to claim 1, wherein the nonaqueous electrolyte contains an oxalate derivative complex.

11. A nonaqueous electrolyte rechargeable battery comprising:
- a positive electrode occluding and discharging lithium ions, the positive electrode containing an olivine-type iron phosphate;
- a negative electrode occluding and discharging lithium ions; and
- a nonaqueous electrolyte containing an additive to generate solvation of the lithium ions and a polycyclic aromatic hydrocarbon, which remains in the nonaqueous electrolyte without being decomposed to fix and stabilize solvated lithium ions by generating a complex of lithium solvation and the polycyclic aromatic hydrocarbon, the additive including an organic solvent having a donor number of 18 to 24, a content of the polycyclic aromatic hydrocarbon being greater than 0% and equal to or less than 2.0% of a total mass of the nonaqueous electrolyte.

12. The nonaqueous electrolyte rechargeable battery of claim 11 wherein the complex includes at least one of an oxalate complex and an oxalate derivative complex.

13. The nonaqueous electrolyte rechargeable battery according to claim 11, wherein a content of the additive is 1.2% to 15.4% of the total mass of the nonaqueous electrolyte.

14. The nonaqueous electrolyte rechargeable battery according to claim 11, wherein the polycyclic aromatic hydrocarbon has an electron affinity lower than that of a graphite.

15. The nonaqueous electrolyte rechargeable battery according to claim 11, wherein the polycyclic aromatic hydrocarbon has a negative electron affinity.

16. The nonaqueous electrolyte rechargeable battery according to claim 11, wherein
- a content of the additive is 1.2% to 15.4% of the total mass of the nonaqueous electrolyte,
- the polycyclic aromatic hydrocarbon has an electron affinity lower than that of a graphite, and
- the nonaqueous electrolyte contains at least one of an oxalate complex and an oxalate derivative complex.

* * * * *